INVENTOR.
CARL H. BECKER
BY
Townsend and Townsend
ATTORNEYS

Oct. 21, 1969 C. H. BECKER 3,474,457

LASER RECORDING APPARATUS

Filed Nov. 13, 1967 3 Sheets-Sheet 2

INVENTOR
CARL H. BECKER
BY
Townsend and Townsend
ATTORNEYS

Oct. 21, 1969 C. H. BECKER 3,474,457

LASER RECORDING APPARATUS

Filed Nov. 13, 1967 3 Sheets-Sheet 3

INVENTOR.
CARL H. BECKER
BY
Townsend and Townsend
ATTORNEYS

United States Patent Office 3,474,457
Patented Oct. 21, 1969

3,474,457
LASER RECORDING APPARATUS

Carl H. Becker, Palo Alto, Calif., assignor to Precision Instrument Company, Palo Alto, Calif.

Filed Nov. 13, 1967, Ser. No. 682,478
Int. Cl. G01d *15/10*
U.S. Cl. 346—76 14 Claims

ABSTRACT OF THE DISCLOSURE

A recording device by which a laser beam is adapted to burn a hole on a metal coating carried on a substrate in which the relationship of frequency band width, scanning velocity, coating transmissivity and substrate thermal skin effect are interrelated to allow wideband, high-density recording.

This invention relates to a new and improved wideband light recording system utilizing coherent optical energy as the recording means to produce an instantaneously reproducible record of high density information in a recording medium with a diffraction limited information bit size.

Optical recording and reproducing techniques have been developed in which a highly focused coherent laser light beam is used to selectively burn away portions of a film deposited on a carrier or substrate forming a recording tape. Such techniques providing permanent and extremely high density information recordation and instantaneous information retrieval, though superior in some ways to other known recording techniques, have themselves been limited by problems.

Thus, the present methods of optical recording with laser light have used opaque coatings such as black emulsions, i.e., Patent No. 3,314,073, or films or relatively thick metal layers as the medium for inforamtion storage. In selectively burning thick metal layer storage media with modulated laser energy, there is a tendency to burn or destroy the substrate on which the film or metal layer is coated, which is inevitable if the coating is completely removed at the hole, such as, for example, taught in Patent No. 3,256,524. In addition, great amounts of laser energy are required in order to record information at the low efficiencies previously attainable.

It is an object of the present invention to provide a method and apparatus for the optical recording of information in thin metal films or layers using focused coherent laser light in which the incident laser energy required to selectively burn the film or layer is substantially limited to the film or layer so that burning or destruction of the film-carrying substrate is eliminated.

Another object of the invention is to reduce the laser power requirements in optical recording by limiting power dissipation of the laser energy in the information storage and recording medium and restricting power dissipation in the substrate on which the information storage and recording medium is coated. In order to accomplish these results the present invention contemplates the provision of an information storage and recording medium in the form of a thin film of metal having a thickness providing measurable transmissivity to allow power dissipation of the incident laser beam energy throughout substantially the entire depth of the metal film deposited on a substrate or carrier. The invention further contemplates modulating the incident beam of laser light with wide-band oscillations in a frequency bandwidth sufficiently high so that the resulting thermal skin effect substantially restricts destructive power dissipation of the incident laser beam energy to the thin metal layer, thereby preventing discoloration and deformation of the substrate.

A feature and advantage of this invention lies in the fact that the high frequency pulse repetition rate can be used to record high density information. The system has the further and coacting advantage of forming holes in the film only, which are of substantially uniform and controlled dimensions of extremely diminutive sizes. These two features when combined allow the system to record information in densities of immense compactness.

A further feature and advantage of this invention lies in the fact that control of the recording repetition rate and the thermal characteristic of the substrate will allow burning of extremely thin metal film with effectiveness and efficiency very closely approximating theoretical limits of such a recording on an unsupported thin metal film without a backing substrate. In the present state of the art, it is completely impossible in a practical system to support such thin metal films without a substrate carrier. Therefore, in the present invention the necessary advantage of the supporting substrate is maintained while the recording ability of the system is closely comparable to the theoretical recording characteristics of the metal film alone.

A feature and advantage of the recording media of the present invention lies in the fact that the thin metal film has desirable characteristics which form a substantial advancement in the art. These characteristics include:

(1) High extinction coefficients which allow thinner coating and faster and more efficient recording;

(2) High resolution which is possible because of nonexistent grain structure and extremely thin coating capabilities;

(3) Reflective qualities which allow reflective monitoring and readout;

(4) Physical hardness which frustrates mechanical destruction;

(5) Immunity to bacteriological or fungus attack as occurs in photographic emulsions;

(6) Permanency in color and contrast;

(7) Complete removal of the recorded area without affecting the substrate and thereby allowing greater bit packing densities;

(8) Instantaneous permanent recording and readout capabilities; and (9) Controllable light transmissivity which allows optical energy to immediately transfer through the depth of the coating to cause simultaneous thermal conversion to the coating and thereby render faster recording capabilities.

Other objects, features and advantages of the present invention will be more apparent after referring to the following specification and accompanying drawings in which.

Figure 1:
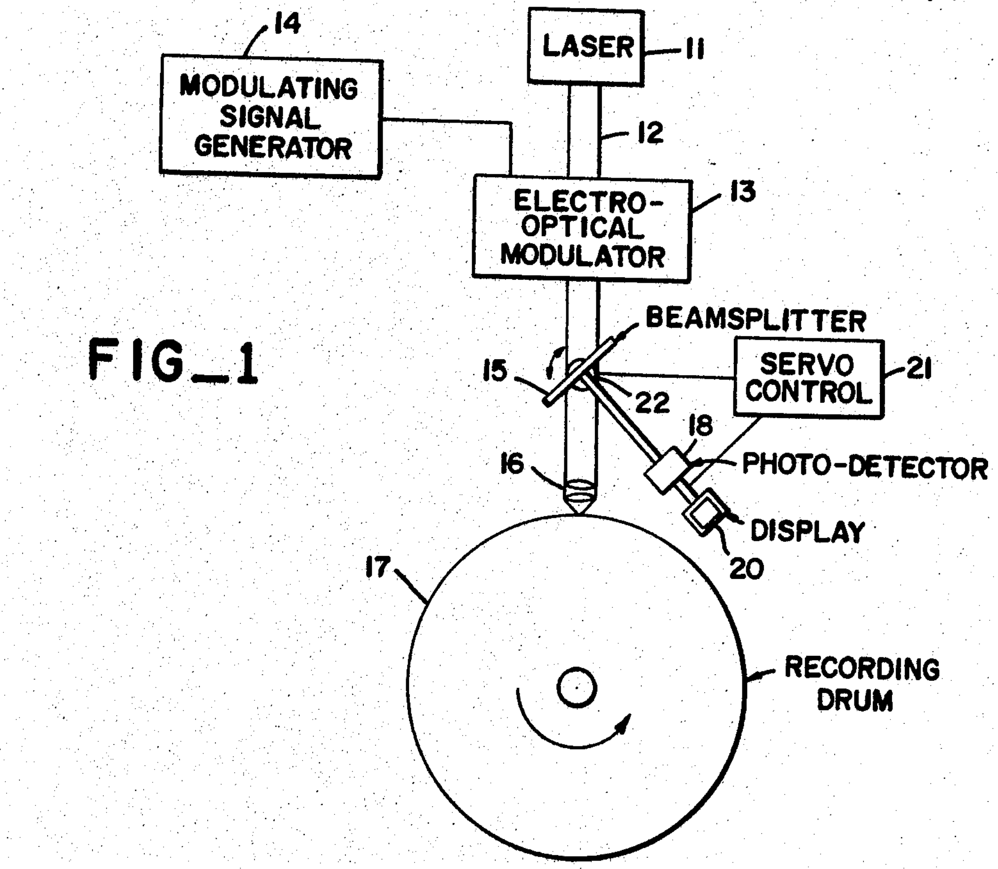
FIG. 1 is a diagrammatic plan view of one form of apparatus embodying the present invention.

In the embodiment of the present invention illustrated in FIG. 1 there is provided a laser light source 11, such as an Argon II ionic laser operating in the $TEM_{00}$ mode, providing a laser beam 12. The laser beam 12 passes through an electro-optical modulator 13, such as a Pockel's cell comprising a potassium diphosphate crystal, whose index of refraction is periodically varied by the application of periodically varying voltage derived from the modulating signal generator 14. The modulating signal generator may produce binary pulse code modulation or wide-band frequency code modulation. The modulated laser beam then passes through beam splitter 15 and is focused by the recording-reading optics 16 onto an information storage and recording medium mounted on a helical guide drum 17 to thereby selectively burn or vaporize portions of the information storage and recording medium according to the varying intensity of the incident modulated laser beam. A portion of the incident laser beam is reflected back from the information recording medium and read-out beam splitter 15 to a photodetector 18 and display means 20, such as a cathode-ray tube, for instantaneous read-out of the recorded information.

The output from photodetector 18 produced by the reflected portion of laser beam 12 from beam splitter 15 may be tapped to provide the input to a servo-control mechanism 21. Servo-control mechanism 21 controls the angular position of beam splitter 15 mounted on pivot 22 with respect to the laser beam 12 to obtain the maximum read-out signal from the beam splitter. Thus, beam splitter 15 is angularly positioned with respect to the laser beam 12 by servo-control mechanism 21 to maximize the output from photodetector 18. Beam splitter 15 is thus similar to a galvanometer mirror.

Figure 2:
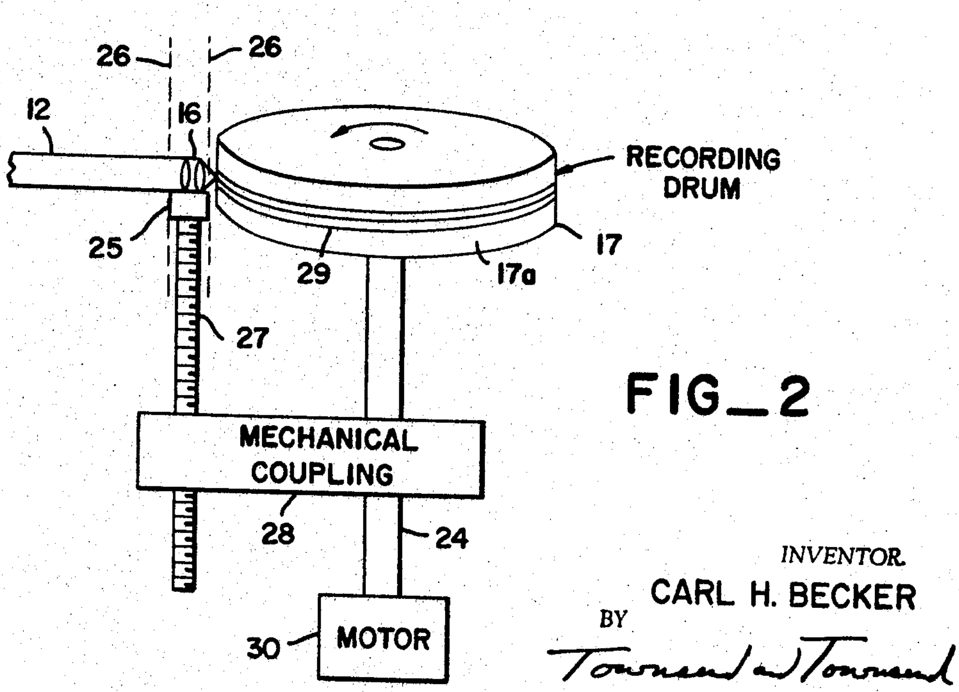
FIG. 2 is a partial diagrammatic side view of the drum and writing optics illustrated in FIG. 1.

As illustrated in FIG. 2, the recording drum 17, on which is mounted the information storage and recording medium **17*a*, is rotated by a synchronous motor 23 and drive shaft 24. The recording and reproducing optics 16 through which the laser beam 12 is focused to a diffraction limited spot on the information storage and recording medium is positioned on a mounting 25 movably mounted for vertical motion within guide means 26. Motion of the mounting 25 and optics 16 is produced by screw means 27 mechanically coupled by coupling 28 to the drive shaft 24 of the recording drum. Motion of the recording optics 16 and recording drum 17 may be synchronized by phase lock servo-control or other means to provide recording on the information recording medium in the form of a helix of predetermined pitch. The minimum width of the pitch of the helix is equal to the diameter of the diffraction limited spot produced by the recording optics 16 and laser beam 17.** Alternatively, instead of a helical recording streak, separate circular recording streaks laterally spaced may be formed on the drum thereby providing separate recording frames on the drum.

The information storage and recording medium comprises a thin layer of metal film 30 coated upon a relatively thick substrate or base 31, as for example by a continuous evaporation process. The thin metal layer is formed with a uniform thickness providing measurable transmissitivity to light so that incident laser energy will be dissipated simultaneously throughout the thin metal layer. The metal film and substrate to which it is integrally bonded may be formed into a tape, disc, drum or other suitable configuration depending upon the recording and reproducing mechanism. Portions 32 of the thin metal layer 30 are burned or vaporized away by the incident focused laser beam. Selective burning may take place according to a pulse code modulation as shown in the row 33, or wide-band frequency code modulation as shown in the row 34.

Vaporization or burning of the information storage and recording medium occurs in minute elements, bits or holes 32, the dimensions of which are limited only by the diffraction characteristics of the recording optics. Thus, each evaporated element or hole cannot be smaller than the first dark Fraunhofer ring of the diffraction pattern of the laser image at the information storage and recording medium. Therefore, the diameter of the burned elements or holes is a function of the laser wavelength and the focal length and effective aperture of the recording optics. The diameter of the diffraction limited elements or holes in turn places an upper limit on the frequency bandwidth $f_W$ of the modulating signals at the recording medium. Thus, the half wave length $\lambda_0/2$ of the highest possible recorded frequency $f_0$ is equal to the diameter of the smallest possible vaporized element or hole. The half wave length $\lambda_0/2$ of the highest possible recording frequency $f_0$ relates, proportionately, the frequency bandwidth $f_W$ to the scanning velocity $V_{scan}$ of the focused laser beam along the information recording medium by the following equation:

$$V_{scan}=2\left(\frac{\lambda_0}{2}\right)f_W$$

Thus, at higher scanning velocities, a higher recording frequency bandwidth is possible for the modulating signals because the wavelengths of the modulating signals are increased relative to the recording medium at higher scanning velocities.

A hole is produced in the information recording medium when the incident laser beam power reaches a threshold value determined by the laser power, laser beam wavelength, scanning velocity and recording frequency. The threshold power W required to vaporize an element or bit from the recording medium can be calculated from the energy U required to vaporize a mass of material from the information recording medium having a volume equal to the volume of an element or bit. The threshold power W is thus the time derivative of the energy required to vaporize a bit or element and is thus given by the following equation:

$$U=W/f_W$$

In order to test the linear relation between the laser threshold power required to vaporize an element or bit from the information recording medium, an information recording medium was used comprising a thin aluminum film continuously evaporated on a clear Mylar substrate or carrier. The physical thickness of the Mylar base is approximately 1.42 mils, $3.6\times10^5$ A., and the physical thickness of the aluminum film is 164 A., equal to one optical thickness of aluminum for the frequency of the laser beam carrier used. A optical thickness of a material is by standard definition that thickness of the material which will allow 10% of the instant light of a selected wavelength to pass through the material. An aluminum film of thickness equal to 164 A. provides reflection of 74% of the incident light, transmission of 10% and absorption of 16% approximately.

A Mylar substrate thickness of approximately 1.42 mils is chosen to secure kinematic stability of the carrier or substrate during the recording and reproducing processes. The thin layer of aluminum is coated on the Mylar substrate to a depth of approximately one optical thickness of the aluminum to thereby provide a transmissivity of 10% of the incident light through the aluminum. The high reflectivity of approximately 74% is reduced to approximately 5% during the creation process of a hole by vaporization or burning of one information bit from the aluminum layer. A 70% total reflectivity variation between "holes" and "no-holes" in the optical thickness of aluminum provides a high signal-to-noise ratio of approximately 40 db for the system. Thus, the upper limit on the transmissivity selected for the metal layer is set by the contrast and signal-to-noise requirements of the recording and reproducing system. Though higher transmissivity is desirable, the contrast between "holes" and "no-holes" is reduced as the reflectivity decreases. In the other directions, transmissivities of as little as 3% have been found effective for use in the metal layer.

An Argon II ionic laser was used providing a laser beam of wavelength 4,880 A., and for the recording-reproducing optics a Zeiss Planachromat 40× objective lens was used, thereby providing a minimum information bit or hole diameter of approximately one micron. With such a minimum information bit dimension, the maximum information density is approximately $6.45\times10^8$ bits per square inch or $10^8$ bits per square centimeter of the information recording medium.

Readings were taken of the threshold laser power required to burn or vaporize an information bit or hole in the information recording medium comprising the aluminum film on a Mylar base at various modulating frequencies and corresponding scanning velocities. The results shown in the graph in FIG. 4 on a log-log scale indicate that the laser threshold power does not vary linearly with the modulating frequency bandwidth as predicted by equation $U=W/f_w$ but rather the laser threshold power varies as the fourth root of the modulating frequency bandwidth and corresponding s canning velocity.

Variance of the experimentally determined relationship between a laser threshold power and maximum frequency bandwidth from the predicted linear relationship results from the "heat sink" produced by the Mylar substrate upon which the aluminum film is coated. Thus, at a scanning velocity of approximately 18 meters per second the predicted maximum frequency bandwidth recordable in one optical thickness of aluminum bounded by air is 89 megahertz. The experimental findings as shown in the graph of FIG. 4 is approximately 10 megahertz indicating that approximately 90% of the incident laser power is dissipated by the Mylar substrate, with one watt maximum laser output.

Figures 3, 4:
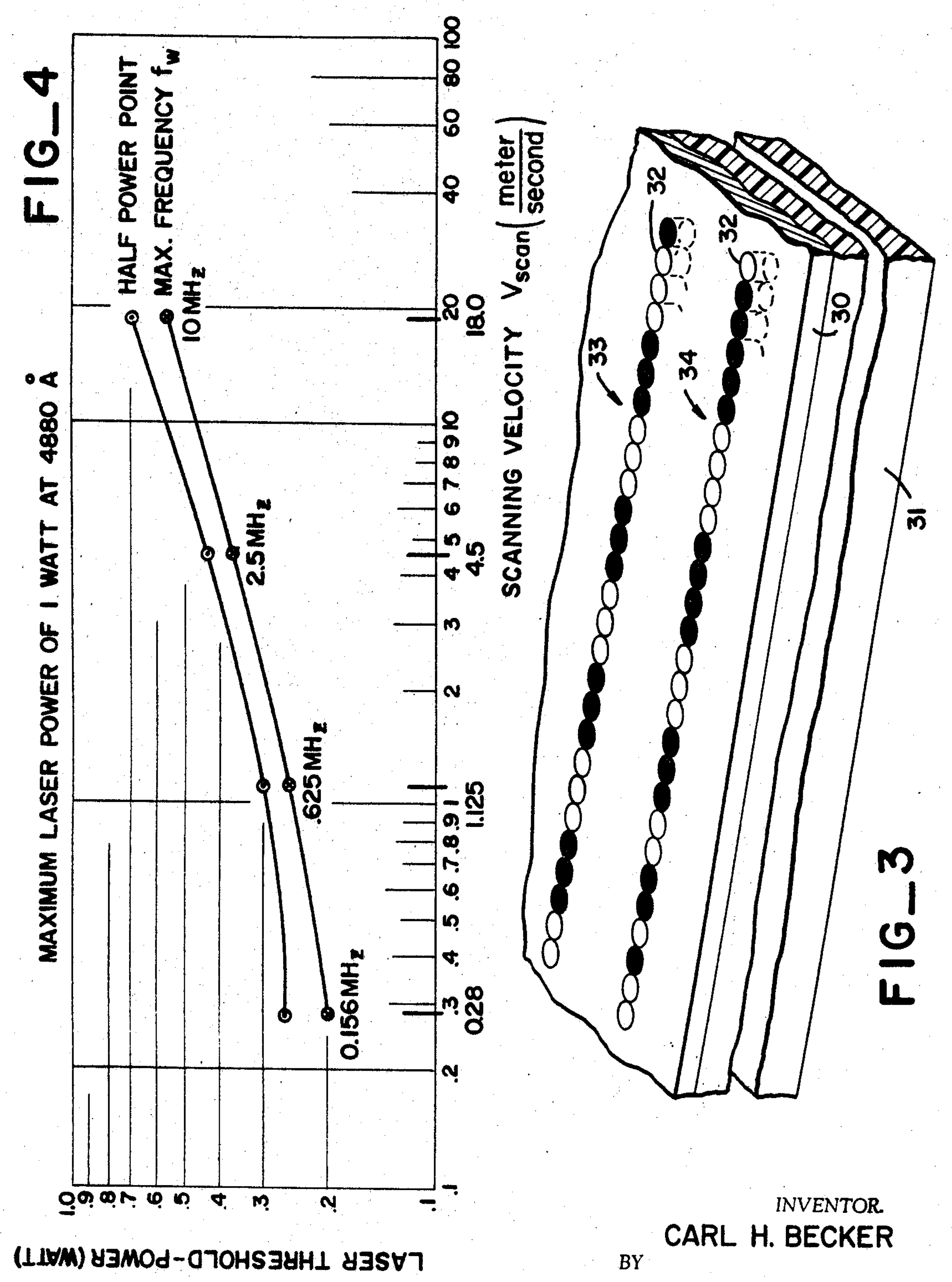
FIG. 3 is a fragmentary, cross-sectional view of a thin metal film and substrate composite embodying the present invention showing bits of information burned in the thin metal film.
FIG. 4 is a graph of threshold laser power as a function of scanning velocity and frequency bandwidth.

For the frequency ranges measured in the graph of FIG. 4, a large percentage of the incident laser energy penetrates through to the Mylar substrate and is dissipated there. The incident laser energy is transported through the recording medium in the form of thermal waves and the thermal energy reaching the Mylar substrate may destructively dissipate resulting in deformation of the Mylar substrate.

The parameters which determine the transport of thermal energy through the aluminum layer and substrate are the thermal conductivity K, temperature conductivity $\underline{K}$ of the respective materials comprising the metal film and substrate. The parameters which determine the power dissipation of transported thermal energy are the thermal impedance Z, and thermal skin depth $d$ of the materials comprising the metal film and substrate. In particular, the thermal skin effect and corresponding thermal skin depth parameter are determinative of one aspect of the present invention.

The incident modulated laser beam induces thermal waves in the information recording metal film layer and Mylar substrate described by the following differential equation, where T is the absolute temperature amplitude of the thermal wave, $x$ is the direction of propagation of the thermal wave in the recording medium, $t$ is the time variable, and $\underline{K}$ is the temperature conductivity:

$$\frac{\partial^2 T}{\partial x^2}-\frac{1}{\underline{K}}\frac{\partial T}{\partial t}=0$$

The time independent solution of the differential equation describes the attenuation of the thermal waves in the recording medium where $T_t$ is the temperature wave amplitude of the transmitted thermal wave, and $T_0$ is the initial temperature amplitude of the thermal wave:

$$T_t=T_{0_e}-\left(\frac{2\pi}{\lambda}x\right)$$

If a depth of penetration $x$ is chosen equal to one thermal wavelength $\lambda$ the transmitted thermal wave amplitude $T_t$ is given by the equation $T_t=T_0{}^{-2\pi}$. Thus, after one thermal wavelength $\lambda$, the amplitude of the thermal wave is reduced to $0.0019T_0$, i.e. 0.19% of the initial thermal wave amplitude. The depth of penetration equal to one thermal wavelength $\lambda$ is designated the thermal skin depth and provides a measure of the depth of thermal penetration and power dissipation in the recording medium. The thermal skin depth, i.e., one thermal wavelength $\lambda$ is given by the following equation:

$$\lambda=\left(\frac{4\pi\underline{K}}{f_w}\right)^{1/2}$$

Indicating that the thermal skin depth is inversely proportional to the square root of the recording frequency bandwidth $f_w$.

Figures 5, 6:
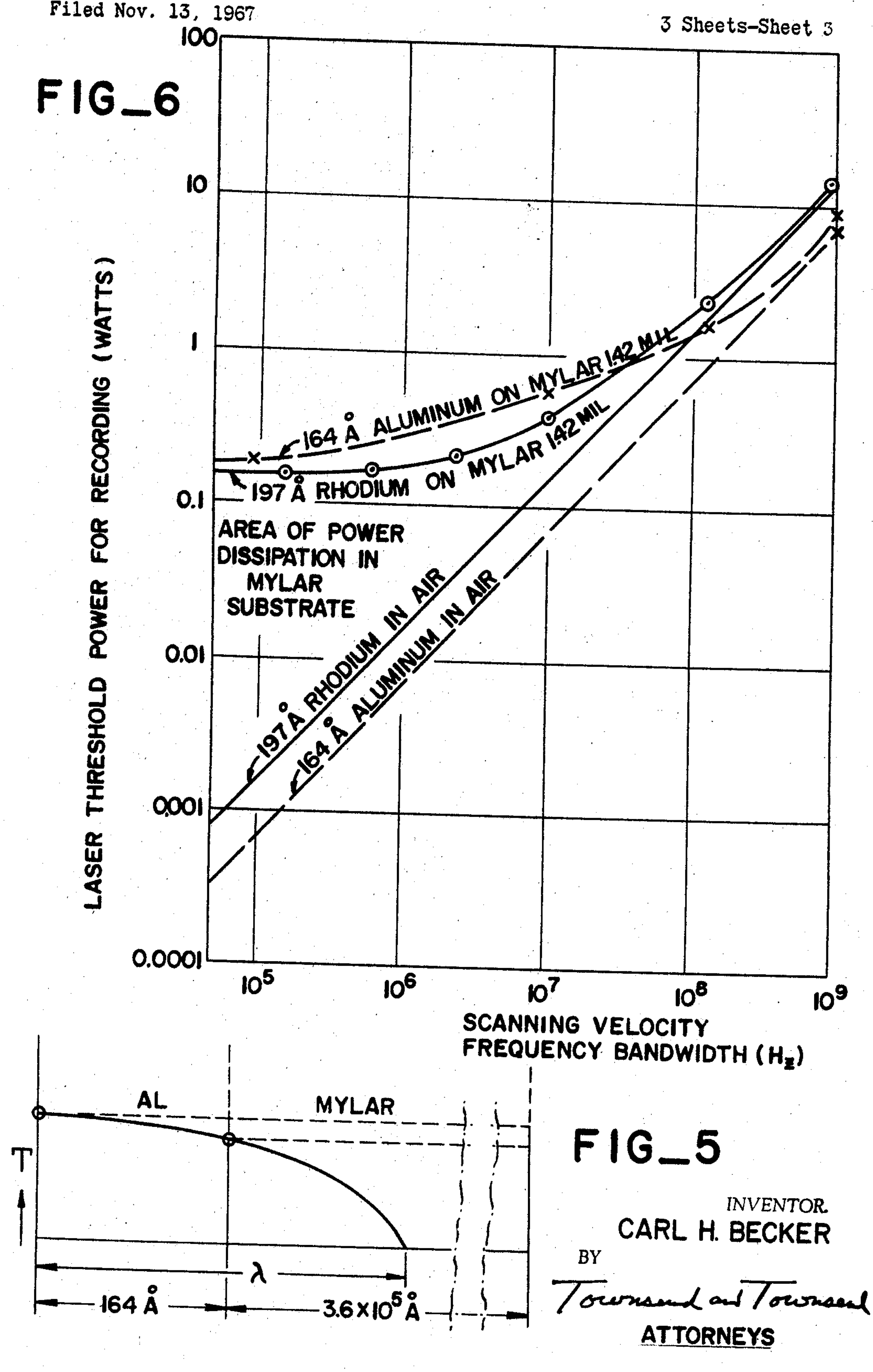
FIG. 5 is a temperature profile graph showing thermal skin depth in the thin metal film and substrate composite.
FIG. 6 is a graph showing laser threshold power as a function of frequency bandwidth using aluminum and rhodium, respectively, for the metal coating.

In the graph shown in FIG. 5, a temperature profile through the recording medium comprising the thin aluminum film and Mylar substrate is illustrated showing attenuation of the temperature wave amplitude with depth, the thermal skin depth $\lambda$ being that point at which the initial thermal wave amplitude is reduced to .19% of its initial value. The lower the frequency the greater is the depth of thermal penetration into the Mylar substrate, while conversely, the higher the frequency the more the thermal penetration and power dissipation is limited to the metal film.

The power density at the recording medium surface emitted from the laser can be calculated from the ratio of the cross section of the laser image at the recording medium surface. The initial temperature amplitude of the thermal wave induced in the recording medium by the incident power density can be calculated from the Stefan-Boltzmann law which relates the fourth power of the temperature to the incident power density.

Power dissipation of the penetrating thermal energy depends among other things upon the thermal impedance, $Z_0$ of the materials comprising the recording medium. The thermal impedance $Z_0$ is given by the following equation, where C is the specific heat of the material, $\rho$ is the density of the material, K is the thermal conductivity, $i$ is equal to $\sqrt{-1}$ and designates the imaginary component of the thermal impedance, and $\Omega$ is the cross-sectional area of the thermal wave penetrating into the recording medium. The unit of $Z_0$ is ° Kelvin/watt.

$$Z_0=\frac{1}{2\omega[\pi f_w\rho ck]^{1/2}}-\frac{i}{2\omega[\pi f_w\rho ck]^{1/2}}$$

The transmitted thermal power I in the recording medium is defined as $I=T/Z_0$ analogous to Ohm's law, where T is the absolute temperature and $Z_0$ is the thermal impedance. Thus, the higher the thermal impedance the lower the power propagation and dissipation in the medium for a constant temperature T. It is advantageous to choose for the substrate or carrier of the information storage and recording medium a material having a substantially higher thermal impedance than the metal film coated thereon in which the information is stored. Power propagation and dissipation can then be eliminated in the substrate or carrier and substantially restricted to the metal film. Since thermal impedance $Z_0$ is inversely proportional to the square root of the frequency bandwidth $f_w$ at higher frequencies where thermal impedance of the metal film is substantially reduced to permit power propagation and dissipation, the thermal impedance of the substrate will still be realtively high. Thus, attention to either the thermal impedance or the thermal skin depth of both of the respective materials comprising the metal film and substrate can substantially limit thermal penetration and power dissipation of the incident laser beam energy to the metal film.

The problem of destructive power dissipation in the recording medium substrate producing disfiguration and destruction of the substrate is thereby seen to result from failure to match the physical thickness of the thin film in which the information is recorded with the thermal impedance and thermal skin depth parameters of the respective materials used for the metal film and substrate, and the recording frequency bandwidth $f_w$. Failure to match these parameters produces a "heat sink" in the substrate which dissipates substantially all of the incident laser power so that no evaporation or burning of the metal film is possible. Rather, the substrate is melted or disfigured in diffraction limited holes. Such destructive power dissipation in the substrate takes place when the thermal skin depth $\lambda$ in the recording film and substrate is approximately in the order of or longer than the physical thickness of the substrate. With decreasing thermal skin depth less power dissipation occurs in the substrate and more is concentrated in the recording film thereby burning the diffraction limited holes in the metal film rather than the substrate.

For the recording medium comprising one optical thickness of aluminum equal to 164 A. coated on a Mylar substrate 1.42 mils thick, on which a focused laser beam from an Argon II ionic laser operating in the $TEM_{00}$ mode at 4880 A. with one watt maximum power is incident through a recording optics comprising a Zeiss Planacromat 40× lens with an effective aperture of 2.6 mils at a scanning velocity $V_{scan}$ approximately 18 meters per second, a recording frequency bandwith of 10 megahertz was obtained indicating that 90% of the incident laser power was dissipated in the Mylar substrate. At 100 megahertz approximately 50% of the incident laser power is operative in the aluminum layer. At 1000 megahertz, one gigahertz, it is expected that approximately ⅔ of the incident laser power is utilized to record information in the aluminum layer. The graph of these results on a log-log scale showing laser threshold power in watts for recording information along the vertical axis and frequency bandwith $f_w$ and corresponding scanning velocity $V_{scan}$ along the horizontal axis is shown in FIG. 6. For the aluminum recording medium discussed above the results are shown in dotted lines. The straight diagonal line shows the theoretical relation between laser recording power and frequency bandwidth expected for an optical thickness of aluminum bounded by air. The actual relationship of laser recording power to frequency bandwidth for one optical thickness of aluminum deposited on the Mylar substrate discussed above is shown in the curved dotted line, the difference between the two lines indicating the amount of power dissipation in the Mylar substrate. It is thus apparent that the higher the frequency, the closer the laser threshold power and frequency bandwidth relationship for the recording medium on a Mylar substrate approaches that of the recording medium bounded by air. It is expected that at a frequency bandwidth of one gigahertz optimum matching will occur providing maximum efficiency in the information recording process.

Similar tests using one optical thickness of rhodium equal to approximately 197 A. on a Mylar substrate 1.42 mils thick were also run with the results shown in the solid lines on the graph of FIG. 6. For the rhodium recording medium, at a recording frequency bandwidth of 10 megahertz, the thermodynamic efficiency of the recording process is approximately 37%, i.e. 37% of the incident laser power is used to burn information in the rhodium layer. At 100 megahertz the thermodynamic efficiency increases to 70% and it can be expected that at one gigahertz the efficiency will reach 90%.

The use of rhodium as an information storage and recording medium provides advantages over aluminum because of its absorption reflection and tarnsmission characteristics at one optical thickness. Thus at one optical thickness equal to approximately 193 A. yielding a transmissivity of approximately 10%, the absorptivity is approximately 43%, substantially higher than that for aluminum while the reflectively is only approximately 47%, substantially lower than aluminum but still providing a high contrast between "holes" and "no-holes" in the recording medium. Other metals may also be chosen for the information recording layer according to these and other parameters discussed herein. Thus, another important parameter is the optical extinction coefficient which in addition to the index refraction of a given medium determines the absorption and dispersion characteristics with respect to incident light of the material. Thus, aluminum and rhodium are desirable because of their relatively high optical extinction coefficients of 5.45 and 4.63 respectively.

It can be appreciated that at the higher frequency bandwidths and corresponding scanning velocities required for higher efficiency, greater laser output power is required due to the theoretical linear relationship between the frequency bandwidth and laser power required for information recording given by $U=W/f_w$.

Such high power lasers are presently becoming available so that the extremely high efficiency achievable in the gigahertz range may be realized.

In order that the higher frequency bandwidths and scanning velocities required to achieve high efficiency in the laser recording process may be utilized, the metal film or coating in which the elementary holes corresponding to information bits are burned must be sufficiently thin so that the energy U necessary to vaporize one information bit can be transmitted to the information recording medium at the high frequencies. The relatively thick recording medium coatings heretofore used in the order of a thousand A. or greater necessitates the use of lower frequencies in order to transmit the required energy per hole U necessary to burn information bits in the information recording medium. According to the present invention, it has been found that thin metal layers providing measurable transmissivity in the order of one optical thickness permits use of the higher frequencies where maximum effieciency may be achieved. Thus, in the past, an aluminum layer 1000 A. thick has been used for a recording medium. But, at a recording bandwidth of one kilohertz, only 0.0002 of the instant laser power remains in the 1000 A. aluminum coating while the rest of the laser power is dissipated in the substrate resulting in destruction and disfiguration of the substrate. Furthermore, the upper frequency bandwidth $f_w$ is limited to approximately one kilohertz.

With an aluminum layer of one optical thickness equal to 164 A., holes are burned in the Mylar substrate in the less than kilohertz frequency range. At such low frequencies, the thermal skin depth in the metal film and Mylar substrate is much longer than the physical thickness of the Mylar. As the frequency is increased, a frequency bandwidth is reached where no hole can be blown in the Mylar but still enough temperature gradient exists in the aluminum layer to vaporize the aluminum while leaving recording marks or darkened areas in the substrate surface. At approximately 10 kilohertz and above, a frequency bandwidth is reached with the 164 A. thickness aluminum layer where holes are created in the aluminum layer by means of evaporation without any noticeable effect upon the Mylar substrate. Thus, the area of destructive power dissipation in the substrate has been passed due to restriction of thermal power dissipation resulting from the thermal skin effect. With further increase of frequency, the power dissipation is further limited to the aluminum layer with increased efficiency until in the gigahertz range power dissipation approximates that of an optical thickness of aluminum bounded by air as shown in the graphs of FIG. 6.

At 10 megahertz, the thermal impedance of Mylar is approximately 450,000 degrees Kelvin per watt (° K./w.) while the thermal impedance is of aluminum and rhodium, 4,730 and 5,281 respectively. Thus, the thermal impedances of the aluminum and rhodium are in the order of 80 to 100 times greater than the thermal impedance of Mylar. Such a difference in thermal impedance has been found successful where with increasing frequency the thermal impedances of the aluminum and rhodium are reduced to provide substantial power propagation and dissipation in the metal film while the thermal impedance of the Mylar remains substantially greater, thereby preventing power propagation and dissipation therein.

Thus, at the higher frequencies of the megaherzt and gigahertz range, dissipation of the incident laser power becomes increasingly concentrated in the metal layer thereby providing increasing efficiency in the hole burning and information storing process while preventing destruction and disfiguration of the information recording medium substrate. Above a certain frequency in the gigahertz range no laser power whatever should enter the susbtrate or carrier.

As the thermal skin depth decreases with increasing frequency to substantially less than the physical thickness of the substrate, destructive power dissipation in the substrate is avoided; and as the thermal skin depth of the metal layer and substrate approaches the physical thickness of the metal layer, optimum efficiency in the use of the incident laser power is approached, as illustrated in the graphs in FIG. 6.

According to the present invention, the metal layer used as an information recording medium must be sufficiently thin so that at the higher frequencies where maximum efficiency is achieved and destructive power dissipation in the substrate is avoided, the necessary energy per hole unnecessary to burn the minimum size hole or information bit in the recording medium may be transmitted to the recording medium. It has been found that a thickness providing measurable transmissivity or a thickness in the order of one optical thickness is sufficiently thin to permit operation at the higher frequencies. Furthermore, transmissivity in the metal layer provides power dissipation of the incident laser energy simultaneously throughout the depth of the metal layer. The relatively high reflectivity of the unburned metal layer and the relatively low reflectivity of the burned or vaporized portions of the metal layer provide a high contrast and signal to noise ratio for reproduction of the stored information.

Information is then recorded by selectively burning or vaporizing the metal film coated on a carrier or substrate with a focused laser beam modulated by oscillations in a band width sufficiently high so that the thermal skin depth in the metal layer and substrate is substantially less than the physical thickness of the metal layer and substrate and optimally approaches the physical thickness of the metal layer. Furthermore, the materials comprising the metal layer and substrate may be chosen optimally so that the thermal impedance of the material comprising the metal layer is in the order of 80 to 100 times greater than the thermal impedance of the material comprising the substrate in the recording bandwidth frequencies.

In the following tables, Table I lists the thermal impedances of various materials at one Hertz and 10 megahertz frequency bandwidths respectively, and Table II lists the thermal skin depths of various materials at one Hertz, 10 megahertz, and one gigahertz frequency bandwidths respectively.

TABLE I.—THERMAL IMPEDANCES

| Material | Thermal Impedance at— | |
|---|---|---|
| | 1 Hz.=$f_w$ | $10^7$ Hz.=$f_w$ |
| Aluminum | $1.5\times10^7$ (° K./watt) | $.49\times10^4$ (° K./watt). |
| Rhodium | $1.7\times10^7$ (° K./watt) | $.55\times10^4$ (° K./watt). |
| Mylar | $1.38\times10^9$ (° K./watt) | $.45\times10^6$ (° K./watt). |
| Quartz (fused) | $1.9\times10^8$ (° K./watt) | $5.8\times10^4$ (° K./watt). |
| Air | $7.1\times10^{10}$ (° K./watt) | $2.2\times10^7$ (° K./watt). |

TABLE II

| Material | Thermal Skin Depth at— | | |
|---|---|---|---|
| | 1 Hz.=$f_w$ | $10^7$ Hz.=$f_w$ | $10^8$ Hz.=$f_w$ |
| Aluminum | $3.5\times10^8$ A. | $11\times10^4$ A. | $3.5\times10^3$ A. |
| Rhodium | $2.75\times10^8$ A. | $8.6\times10^4$ A. | $2.75\times10^3$ A. |
| Mylar | $5.1\times10^6$ A. | $16\times10^2$ A. | 51 A. |

While one embodiment of my invention has been shown and described, it will be apparent that other adaptations and modifications may be made without departing from the true spirit and scope of the invention.

What is claimed is:

1. A recording system comprising: a recording medium formed of a substrate having high optical transmissivity and a metal coating integrally formed on said substrate, a laser providing a laser beam of a predetermined wavelength, optical means for focusing the laser beam on the recording medium, said coating being sufficiently thin to afford at least 3% light transmissivity therethrough of the light from said laser beam.

2. A recording system of the type employing a laser beam having a predetermined wavelength and an information recording medium on which information is recorded by the action of the modulated laser beam selectively burning portions of the information recording medium comprising: a recording medium formed of a substrate and a metal coating integrally bonded to said substrate, said coating being of a thickness of approximately one optical thickness with respect to the laser beam wavelength, means focusing said laser beam on said recording medium, means providing relative motion between the focused laser beam and the recording medium at a predetermined scanning velocity, means modulating the laser beam in a selected frequency bandwidth, said substrate having a thermal impedance at least at approximately 80 times greater than said metal coating at the modulating frequency bandwidth, said frequency bandwidth being a function of said scanning velocity.

3. A recording system comprising: a laser providing a coherent light beam, a recording medium for use with said coherent beam of light, said medium formed of a substrate having a metal coating integrally formed thereon, said coating being sufficiently thin to afford at least 3% light transmissivity therethrough of the light from said laser beam, optical means for limiting the size of said coherent light beam to a diffraction limited dimension and for projecting said diffraction limited beam on said coating, means providing relative motion between the projected laser beam and the recording medium at a predetermined scanning velocity, means modulating said laser beam in a predetermined frequency bandwidth so that the thermal skin depth in the coating and substrate is substantially less than the physical thickness of the coating and substrate, said coating being sufficiently thin and having a thermal impedance sufficiently low at said predetermined frequency bandwidth to cause thermal energy induced by said coherent beam to evaporate said coating, and said substrate having sufficient thermal impedance at said predetermined frequency bandwidth to substantially eliminate power dissipation of the incident coherent beam energy in the substrate, said frequency bandwidth being a function of said scanning velocity.

4. A recording system of the type having a laser beam, means modulating the laser beam in a predetermined frequency bandwidth, a recording medium formed of a substrate having a metal coating of uniform thickness formed thereon, and means for projecting said modulated beam on said coating comprising: said modulation means being at a frequency repetition rate of at least F, said coating having an optical thickness of approximately one, and said substrate having a physical thickness and a thermal skin depth λ and wherein F is sufficiently great to render λ substantially less than the physical thickness of the substrate.

5. A laser recording system comprising: laser means providing a coherent beam of light at an operating laser wavelength; a recording medium comprising a thin metal layer having a transmissivity of at least 3% at the operating laser wavelength coated on a substrate of substantially transparent material; optical means for focusing said beam of light on the recording medium; means for providing relative motion between the recording medium and focused light beam at a predetermined scanning velocity; modulating means for modulating said light beam in a predetermined frequency bandwidth sufficiently high so that the thermal skin depth in the recording medium is substantially less than the physical thickness of the recording medium, said frequency bandwidth being a function of the scanning velocity.

6. A laser recording system as set forth in claim 5 wherein the thin metal film is approximately one optical thickness of the metal at the operating laser wavelength.

7. A laser recording system as set forth in claim 5 wherein the thermal skin depth in the recording medium substantially approximates the physical thickness of the thin metal layer at the predetermined modulating frequency bandwidth.

8. A laser recording system as set forth in claim 5 wherein the thermal impedance of the substrate is approximately at least 80 times greater than the thermal impedance of the metal layer at the predetermined modulating frequency bandwidth.

9. A recording system of the type employing a laser beam having a predetermined wavelength and an information recording medium on which information is recorded by the action of the modulated laser beam selectively burning portions of the information recording medium comprising: a recording medium formed of a metal coating integrally bonded to a substrate, said coating being of a thickness of approximately one optical thickness of said metal with respect to the laser beam wavelength, means focusing said laser beam on said recording medium, means providing relative motion between the focused laser beam and the recording medium at a predetermined scanning velocity, and means modulating the intensity of the laser beam in a selected frequency bandwidth so that the thermal skin depth in the substrate substantially approaches the thickness of the metal coating.

10. A recording system as set forth in claim 9 wherein said selected frequency bandwidth is at least approximately 10 megahertz.

11. A recording system as set forth in claim 9 wherein the thermal impedance of the substrate material is at least approximately 80 times greater than the thermal impedance of the metal coating in the selected frequency bandwidth.

12. A recording system of the type employing a laser beam having a predetermined wavelength and an information recording medium on which information is recorded by the action of the modulated laser beam selectively burning portions of the information recording medium comprising: a recording medium formed of a metal coating integrally bonded to a substrate, said coating being of a thickness to afford at least approximately 3% transmissivity with respect to the laser beam wavelength, means focusing said laser beam on said recording medium, means providing relative motion between the focused laser beam and the recording medium at a predetermined scanning velocity, means modulating the intensity of the laser beam in a selected frequency bandwidth so that the thermal skin depth in the substrate substantially approaches the thickness of the metal coating.

13. A recording system as set forth in claim 12 wherein the metal forming the metal coating is selected from the group consisting of aluminum and rhodium.

14. A recording system as set forth in claim 12 wherein the metal forming the metal coating has an optical extension coefficient of at least 4.

References Cited

UNITED STATES PATENTS

| | | | |
|---|---|---|---|
| 3,256,524 | 6/1966 | Stauffer | 346—76 |
| 3,314,073 | 4/1967 | Becker | 346—76 |

OTHER REFERENCES

Helium-Neon Laser: Thermal High-Resolution Recording, Science, Dec. 23, 1966, Vol. 154, No. 3756, pages 1550–1551.

JOSEPH W. HARTARY, Primary Examiner

U.S. Cl. X.R.

331—94.5; 346—135